United States Patent
Kim et al.

(10) Patent No.: US 9,769,549 B2
(45) Date of Patent: Sep. 19, 2017

(54) BUILDING SENSING MANAGEMENT SYSTEM AND DRIVING METHOD THEREOF

(71) Applicant: ELECTRONICS AND TELECOMMUNICATIONS RESEARCH INSTITUTE, Daejeon (KR)

(72) Inventors: Hyun Hak Kim, Daejeon (KR); Tae Wook Heo, Sejong-si (KR); Jong Am Jun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/083,828

(22) Filed: Mar. 29, 2016

(65) Prior Publication Data
US 2016/0295305 A1 Oct. 6, 2016

(30) Foreign Application Priority Data
Mar. 31, 2015 (KR) .......... 10-2015-0045324

(51) Int. Cl.
*H04Q 9/00* (2006.01)
*G08C 25/00* (2006.01)

(52) U.S. Cl.
CPC .............. *H04Q 9/00* (2013.01); *G08C 25/00* (2013.01)

(58) Field of Classification Search
CPC .................. G08C 25/00; H04Q 9/00

USPC .............................. 340/870, 870.16
See application file for complete search history.

(56) References Cited

U.S. PATENT DOCUMENTS

| 8,756,024 B2 | 6/2014 | Hedley et al. | |
| 2010/0141423 A1* | 6/2010 | Lin | G08B 25/10 340/539.1 |
| 2012/0133287 A1* | 5/2012 | Steiner | G01J 1/02 315/158 |
| 2012/0246261 A1* | 9/2012 | Roh | G06F 13/385 709/217 |
| 2013/0285835 A1 | 10/2013 | Kim et al. | |
| 2013/0304423 A1* | 11/2013 | Heo | G06F 17/00 702/189 |
| 2014/0240688 A1* | 8/2014 | Fritsch | G01D 5/24495 356/3 |

(Continued)

OTHER PUBLICATIONS

Taewook Heo et al., "Adaptive dual prediction scheme based on sensing context similarity for wireless sensor networks", Electronics Letters, vol. 50, No. 6, pp. 467-469, Mar. 13, 2014.

*Primary Examiner* — Hirdepal Singh
(74) *Attorney, Agent, or Firm* — Rabin & Berdo, P.C.

(57) ABSTRACT

Provided herein is a sensing management system capable of minimizing the amount of data transmission from sensors, the system including a plurality of sensors configured to sense information of surrounding environment, and, in response to a sensing value transmitted to a controller having a slope of a same directivity for twice or more times, to obtain a predicted slope using a current slope of the transmitted sensing values; and the controller configured to obtain the predicted slope using a same algorithm as the sensors, wherein, in response to a next sensing value being within an error range of the predicted slope, the sensors do not transmit the next sensing value to the controller.

15 Claims, 3 Drawing Sheets

(56) References Cited

U.S. PATENT DOCUMENTS

| | | | |
|---|---|---|---|
| 2014/0288866 A1* | 9/2014 | Lee | G01D 3/08 |
| | | | 702/89 |
| 2014/0376771 A1 | 12/2014 | Moon et al. | |
| 2015/0085119 A1* | 3/2015 | Dagan | G06T 7/2033 |
| | | | 348/148 |
| 2015/0153807 A1* | 6/2015 | Hao | G06F 1/325 |
| | | | 713/320 |
| 2016/0356633 A1* | 12/2016 | Mohan | G06Q 10/06 |

* cited by examiner

BUILDING SENSING MANAGEMENT SYSTEM AND DRIVING METHOD THEREOF

CROSS-REFERENCE TO RELATED APPLICATION

The present application claims priority to Korean patent application number 10-2015-0045324, filed on Mar. 31, 2015, the entire disclosure of which is incorporated herein in its entirety by reference.

BACKGROUND

Field of Invention

Various embodiments of the present disclosure relate to a building sensing management method and a driving method thereof, and more particularly, to a building sensing management system that is capable of minimizing the amount of data being transmitted from sensors, and a driving method thereof.

Description of Related Art

Thanks to the rapid development of science, technologies and societies, the number of buildings is increasing worldwide, and these buildings are developing into pleasant and comfortable places where people can rest and work.

Recently, buildings are being integrated with IT, and are being designed for automation and security purpose using electricity, lighting, wireless sensors and the like. Furthermore, with the development of wireless network, various services are being provided inside the buildings using wireless network infrastructure.

Meanwhile, numerous sensors are being installed inside a building. These sensors may provide data of the places where they are installed (for example, environment information) to a controller. Then, using the data from the sensors, the controller may control the environment inside the building. Herein, the numerous sensors generally transmit the data periodically. Such periodical transmission of environment information secures the reliability of the data being transmitted. And when there are just a small number of sensors, a small amount of data will be transmitted, which will lessen the burden on the network.

When the sensors transmit data periodically, however, the traffic of the network will increase exponentially in response to an increase of the number of the sensors, which is a problem. Therefore, in recent days, a dual prediction scheme is being used when transmitting and receiving data. The dual prediction scheme refers to a scheme where a sensor (sensor node) that transmits information and a controller (sync node) that receives information use the same prediction algorithm.

In terms that an error of a sensing value is allowable to some degree, the dual prediction scheme is a different method from synchronization which synchronizes a sensor value precisely. Such a dual prediction scheme is capable of significantly reducing the amount of traffic of a network due to this allowable error (threshold).

Examples of the dual prediction scheme include Constant Measurement (hereinafter referred to as "CM"), LMS (Least Mean Square), RLS (Recursive Least Square), AR (AutoRegression), ARMA (AutoRegression Moving Average), ES (Exponentially Smoothing), and Dual Kalman Filter and the like, and of these methods, the CM method is mostly generally used.

In the CM method, a constant error range is predetermined, and if a measured value is not outside the predetermined error range, the measured value is not transceived. That is, in the CM method, the measured data is transmitted only when it is outside the error range, and therefore the amount of data transmission may be reduced to some extent.

However, in the CM method, the amount of data transmission may increase significantly when the environment is changing continuously. For example, in the CM method, a sensing value changes in a sinewave format, and if the error range is smaller than the amplitude of a sinewave, the sensed data must be transmitted at least every half the period of the sinewave.

SUMMARY

Therefore, various embodiments of the present disclosure are directed to provide a building sensing management system that is capable of minimizing the amount of data being transmitted from sensors and a driving method thereof.

According to an embodiment of the present disclosure, there is provided a building sensing management system including a plurality of sensors configured to sense information of surrounding environment, and, in response to a sensing value transmitted to a controller having a slope of a same directivity for twice or more times, to obtain a predicted slope using a current slope of the transmitted sensing values; and the controller configured to obtain the predicted slope using a same algorithm as the sensors, wherein, in response to a next sensing value being within an error range of the predicted slope, the sensors do not transmit the next sensing value to the controller.

In an embodiment, in response to the next sensing value being outside the error range of the predicted slope, the plurality of sensors may transmit the next sensing value to the controller.

In an embodiment, in response to the next sensing value reported to the controller having a slope of a same directivity as the current slope, the sensors and the controller may re-set the current slope by adding the next sensing value.

In an embodiment, in response to the next sensing value reported to the controller having a slope of a directivity different from the current slope, the sensors and the controller may be driven in a CM (Constant Measurement) method.

In an embodiment, the error range may vary in proportion to the current slope.

In an embodiment, the current slope may include a plurality of slopes ($X_n$, $X_{n-1}$, ...) in response to the sensing values transmitted to the controller, and the predicted slope may be generated by assigning a high weighted value to a recent slope ($X_n$) and assigning a low weighted value to a previous slope ($X_{n-1}$, ...).

In an embodiment, each of the plurality of the sensors may obtain the predicted slope by assigning a high weighted value to a current slope generated by itself and assigning a low weighted value to a current slope being provided from other sensors.

In an embodiment, in response to a half or more of directivities of current slopes provided from other sensors being changed, each of the sensors may set the current slope to "0", and may be driven in response to a CM (Constant Measurement) method.

In an embodiment, in response to a half or more of directivities of current slopes provided from other sensors being changed, each of the sensors may obtain the predicted slope by assigning a high weighted value to the current slope being provided from other sensors, and assigning a low weighted value to the current slope generated by itself.

According to another embodiment of the present disclosure, there is provided a method for driving a building sensing management system that includes a plurality of sensors for collecting environment information, each of the sensors including collecting the environment information to generate a sensing value, and transmitting the generated sensing value to a controller at least twice; in response to the sensing value transmitted to the controller having a slope of a same directivity for twice or more times, obtaining a predicted slope using a current slope; and in response to a next sensing value being within an error range of the predicted slope, not transmitting the next sensing value to the controller, and in response to the next sensing value being outside the error range of the predicted slope, transmitting the next sensing value to the controller.

In an embodiment, the sensors and the controller may obtain the predicted slope by a same algorithm.

In an embodiment, in response to the next sensing value reported to the controller having a slope of a same directivity as the current slope, the method may involve re-setting the current slope by adding the next sensing value.

In an embodiment, in response to the next sensing value reported to the controller having a slope of a directivity different from the current slope, the sensors and the controller may be driven using a CM (Constant Measurement) method.

In an embodiment, the error range may vary in proportion to the slope.

According to the building sensing management system and a driving method thereof according to the various aforementioned embodiments of the present disclosure, in the case where the sensing values reported to the controller ascend or descend continuously, a predicted slope may be obtained using the current slope. Furthermore, in the case where a sensing value is within the error range of the predicted slope, the sensing value is not transmitted from the sensor to the controller. In such a case, even when the sensing value ascends or descends continuously, it is possible to minimize the amount of data being transmitted.

Furthermore, according to the present disclosure, in the case where the slope is changed by a next sensing value reported to the controller (that is, changing from ascending to descending or vice versa), whether or not to transmit the data is controlled by the CM method. In this case, it is possible to minimize the amount of data being transmitted even when the sensing value repeats ascending and descending.

BRIEF DESCRIPTION OF THE DRAWINGS

The above and other features and advantages of the present disclosure will become more apparent to those of ordinary skill in the art by describing in detail embodiments with reference to the attached drawings in which.

DETAILED DESCRIPTION

Figure 1:
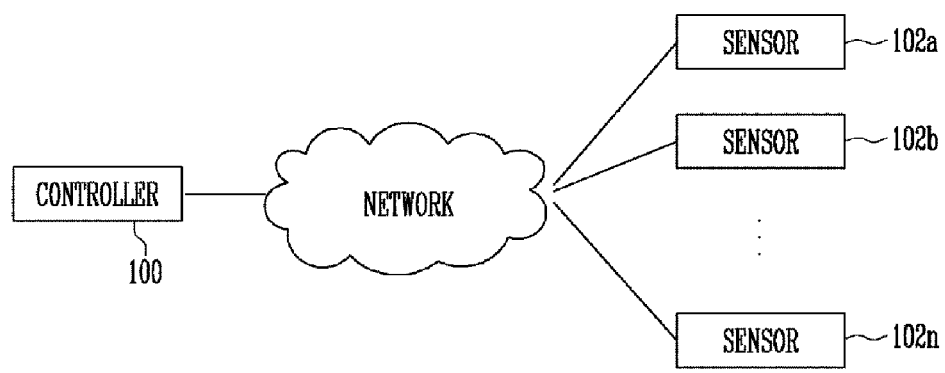
FIG. 1 is a view schematically illustrating a building sensing management system according to an embodiment of the present disclosure.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be predicted. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

FIG. 1 is a view schematically illustrating a building sensing management system according to an embodiment of the present disclosure.

Referring to FIG. 1, the building sensing management system according to an embodiment of the present disclosure has a controller 100 and sensors 102a to 102n.

The controller 100 receives sensing values from one or more sensors 102a to 102n, and controls the environment inside a building in response to the received sensing values. For example, the controller 100 may control the heating system inside the building in response to temperature data provided from a sensor (at least one of 102a to 102n).

The sensors 102a to 102n may each be installed in a predetermined place inside the building, and may collect environment information of the place where it is installed. For example, the sensors 102a to 102n may collect at least one piece of information of among various pieces of information such as the temperature, humidity, illumination, carbon monoxide (CO), carbon dioxide ($CO_2$), fine dust, ultra fine dust, yellow dust, sound, acoustic sound and the like. The information collected in the sensors 102a to 102n may be provided to the controller 100 via a network.

Meanwhile, according to the present disclosure, the controller 100 and sensors 102a to 102n include a same prediction algorithm. An assumption will be made that the controller 100 and sensors 102a to 102n include a Sloping Constant Measurement (hereinafter referred to as "SCM") algorithm, for the sake of convenient explanation. The SCM algorithm has a predetermined error range (or threshold), and calculates a predicted slope based on a current slope. This will be explained in greater detail hereinafter.

The network may be one of various types of communication means including wired and wireless communication means. Examples of the network that may be used herein include Zigbee, Bluetooth, Wifi, Internet of Things, Sub-Giga and the like.

Figure 2:
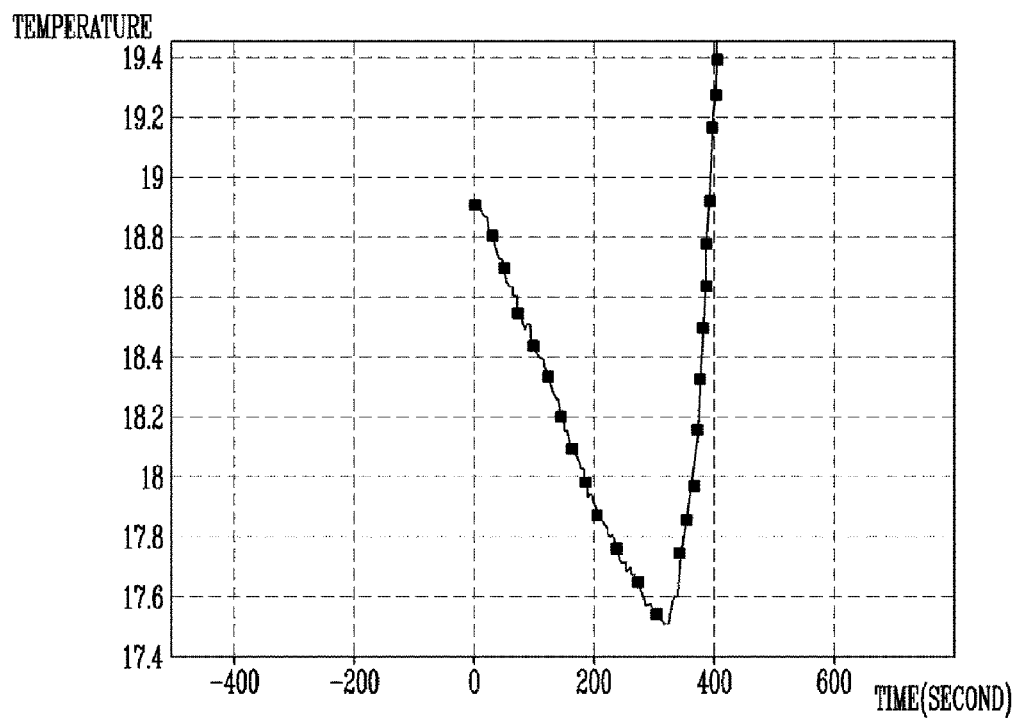
FIG. 2 is a view illustrating a general CM method.

FIG. 2 is a view illustrating a general CM method. Referring to FIG. 2, an assumption will be made that the temperature is measured in a first sensor 102a, for the sake of convenient explanation. In the graph of FIG. 2, axis Y indicates the temperature while axis X indicates the time.

Referring to FIG. 2, the sensor 102a measures the temperature of the place it is installed (for example, at every certain period). In response to a measured temperature being outside an error range, the sensor 102a transmits the sensing value (that is, temperature) to the controller 100, and in response to the measure temperature being within the error range, the sensor 102a does not transmit the sensing value to the controller 100. When a sensing value is not transmitted to the controller 100, the controller 100 determines that the measured sensing value is within the error range. In this case, the controller 100 may control the temperature inside the building in response to the sensing value transmitted the latest.

Meanwhile, a sensing value measured when the temperature suddenly increased or decreased will go outside the error range continuously. In this case, the sensor 102a transmits to the controller 100 the sensing value measured every time the temperature is outside the error range. For example, in the case where the temperature suddenly decreased and increased, and the error range is set to ±0.1 degrees, the sensor 102a provides the sensing value to the controller 100 twenty-five times, as illustrated in FIG. 2.

That is, the aforementioned CM method may minimize the number of times of transmitting the sensing value when the measured sensing value is stably maintained. However, when the measured sensing value changes continuously, the number of times of transmitting the sensing value will increase significantly.

Figure 3:
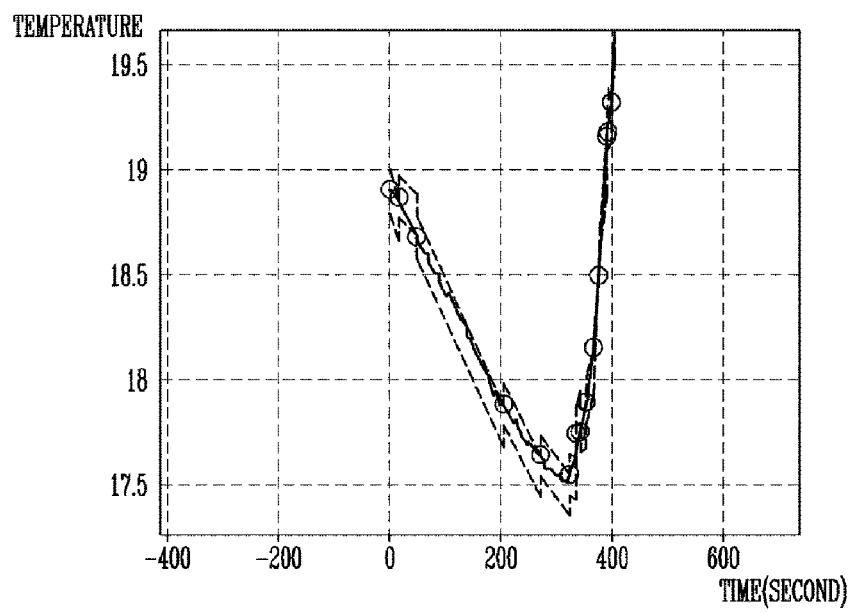
FIG. 3 is a view illustrating an SCM method according to an embodiment of the present disclosure.

FIG. 3 is a view illustrating an SCM method according to an embodiment of the present disclosure. An assumption will be made with reference to FIG. 3 that the temperature is measured in the first sensor 102a for the sake of convenient explanation. In the graph of FIG. 3, axis Y indicates the temperature, while axis X indicates the time.

Referring to FIG. 3, the sensor 102a measures the temperature of the place where it is installed. In response to a measured temperature not being within the error range, the sensor 102a transmits the sensing value to the controller 100, and in response to the measured temperature being within the error range, the sensor 102a does not transmit the sensing value to the controller 100. When the sensing value is not transmitted, the controller 100 determines that the measured sensing value is within the error range.

More specifically, in the SCM method of the present disclosure, in the case were two or more sensing values transmitted to the controller 100 have a same directivity (that is, continuously ascending or descending), the controller 100 and sensor 102a calculate the current slope. Thereafter, the controller 100 and sensor 102a calculate a predicted slope based on the current slope. After the predicted slope is calculated, in response to the measured sensing value being within the error range of the predicted slope, the sensor 102a does not transmit the sensing value to the controller 100. When the sensing value is not transmitted from the sensor 102a, the controller 100 predicts the sensing value using the predicted slope, and controls the environment inside the building using the predicted sensing value.

Such an SCM method of the present disclosure may minimize the number of times of transmitting a sensing value in the case where the sensing value changes with a constant slope (descending and ascending). For example, in the case where the temperature suddenly decreases and increases, and the error range is set to ±0.1 degrees as illustrated in FIG. 3, the sensor 102a provides the sensing value to the controller 100 fourteen times. That is, comparing the CM method of FIG. 2 and the SCM method of FIG. 3, the SCM method of the present disclosure is capable of minimizing the number of times of transmitting a sensing value in response to a same temperature change.

Meanwhile, in the case of predicting a sensing value using a predicted slope only, the number of times of transmitting a sensing value may increase at an inflection point where the directivity of the slope changes. Therefore, at the inflection point where the directivity of the slope changes, the SCM method of the present disclosure controls whether or not to transmit a sensing value using the CM method.

More specifically, as aforementioned, the sensor 102a controls whether or not to transmit a sensing value using a predicted slope generated based on the current slope. Thereafter, in response to the measured sensing value being outside the error range of the predicted slope, the sensor 102a transmits the recent sensing value to the controller 100. Furthermore, in response to the recent sensing value having a same directivity as the current slope, the sensor 102a calculates the current slope including the recent sensing value, and calculates the predicted slope using the current slope. Thereafter, the sensor 102a controls whether or not to transmit the sensing value using the new predicted slope.

Meanwhile, in response to the recent sensing value having a different directivity from the current slope, that is, in response to the directivity of the slope being changed, the sensor 102a controls whether or not to transmit the sensing value using the CM method. Likewise, in response to the recent sensing value from the sensor 102a having a different directivity as the current slope, the controller 100 is driven in response to the CM method.

Figure 4:
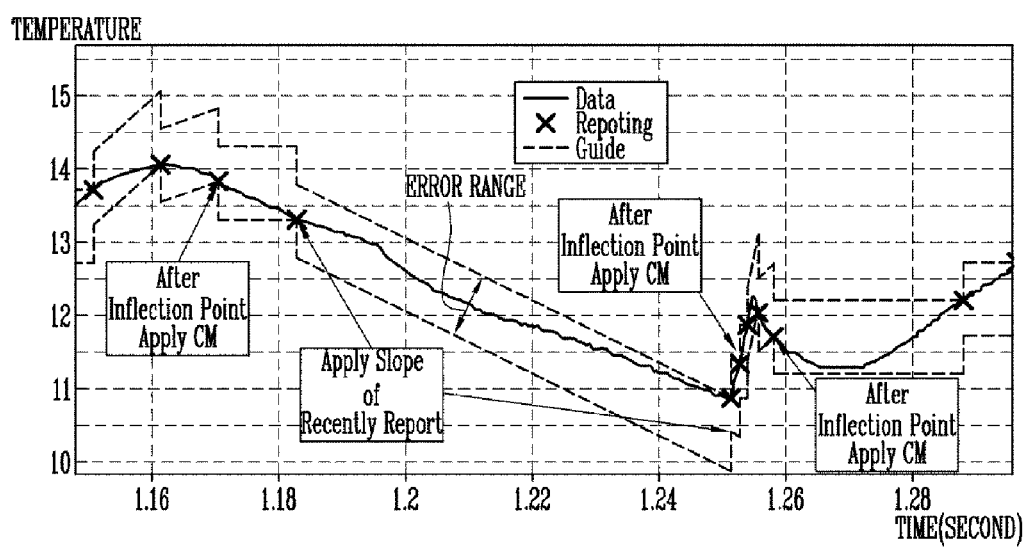
FIG. 4 is a view illustrating an embodiment where the SCM method of the present disclosure has been applied.

FIG. 4 is a view illustrating an embodiment where the SCM method of the present disclosure has been applied. In FIG. 4, data indicates the actually measured sensing value, and guide indicates the error range. Furthermore, X indicates the point where the sensing value is transmitted.

Referring to FIG. 4, in the SCM method of the present disclosure, in response to at least two sensing values transmitted to the controller having a slope of a same directivity, the sensor (at least one of 102a to 102n) predicts a slope using the current slope, and in response to the sensing values being within the error range of the predicted slope, the sensor (at least one of 102a to 102n) does not transmit the sensing value to the controller 100. Furthermore, the sensor (at least one of 102a to 102n) compares the sensing value (that is outside the error range of the predicted slope) recently transmitted to the controller 100 with the current slope, and in response to the slope of the recently transmitted sensing value having a different directivity, the sensor (at least one of 102a to 102n) controls whether or not to transmit the sensing value using the CM method.

In this case, in response to the sensing value descending (or ascending) continuously as illustrated in FIG. 4, it is possible to minimize the number of times of transmitting the sensing value using the predicted slope. Furthermore, also in response to the sensing value descending and then ascending, it is possible to minimize the number of times of transmitting the sensing value using the CM method.

Additionally, in the present disclosure, various algorithms may be used to predict a slope. For example, it is possible to assign a high weighted value to a recent slope (Xn), and assign a low weighted value to a previous slope (Xn-1) to obtain a predicted slope. In other words, in the case where there are ten slopes due to the sensing value transmitted to the controller 100, it is possible to multiply nine previous slopes by 1/10, and multiply the recent slope by 9/10, and obtain the predicted slope.

Meanwhile, a certain sensor (at least one of 102a to 102n) may receive a slope in response to a sensing value from the sensors nearby. In such a case, a certain sensor (at least one of 102a to 102n) may assign a low weighted value (for example, 1/10) to a current slope input from the sensors nearby, and assign a high weighted value to its current slope, and obtain the predicted slope.

Furthermore, in response to the directivity of a current slope input from the sensors nearby being changed for or more than a certain degree (for example, for a half or more), a certain sensor (at least one of 102a to 102n) may be driven by the CM method while setting its current slope to "0" at the same time.

In addition, in response to the directivity of a current slope input from the sensors nearby being changed for or more than a certain degree (for example, for a half or more), a certain sensor (at least one of 102a to 102n) may assign a high weighted value to the current slope being input from the sensors nearby, and assign a low weighted value to its current slope, and obtain a predicted slope.

Figure 5:
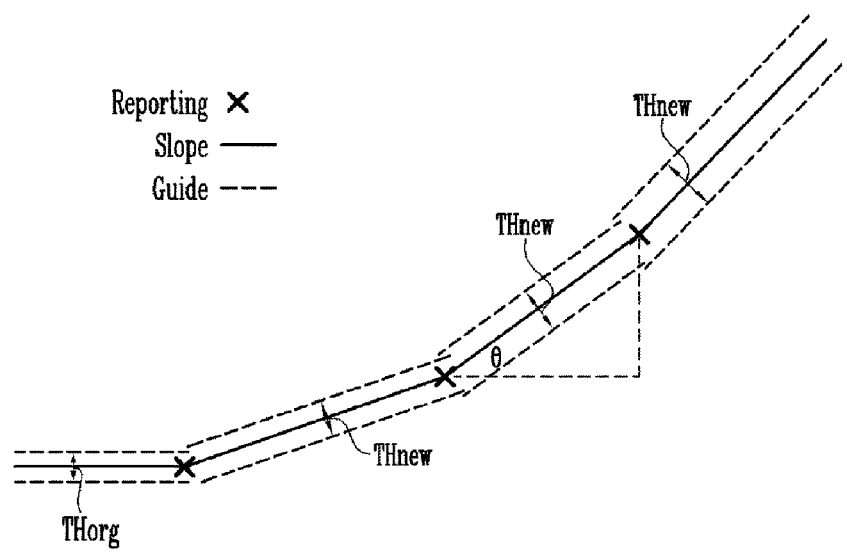
FIG. 5 is a view illustrating error ranges according to an embodiment of the present disclosure.

FIG. 5 is a view illustrating error ranges according to an embodiment of the present disclosure. In FIG. 5, X indicates the transmitting point of the sensing value, and Guide indicates the error range.

Referring to FIG. 5, the error range is changed in proportion to the current slope as in math formula 1.

$$THnew \approx \theta \times THorg \quad \text{[Math formula 1]}$$

In math formula 1, THorg indicates an initial error range, THnew indicates the error range that changes in response to the slope ($\theta$). That is, in the present disclosure, the greater the slope, the greater the error range. In the case where the error range changes in proportion to the slope as aforementioned, it is possible to prevent the number of times of transmitting from increasing significantly in response to the change in a sensing value.

In addition, in the present disclosure, various formulas may be applied such that the error range changes in proportion to the slope. For example, as in math formula 2, it is possible to obtain the error range in response to a change in a slope using cos.

$$THnew = \frac{THorg}{\cos\theta} \quad \text{[Math formula 2]}$$

Figure 6:
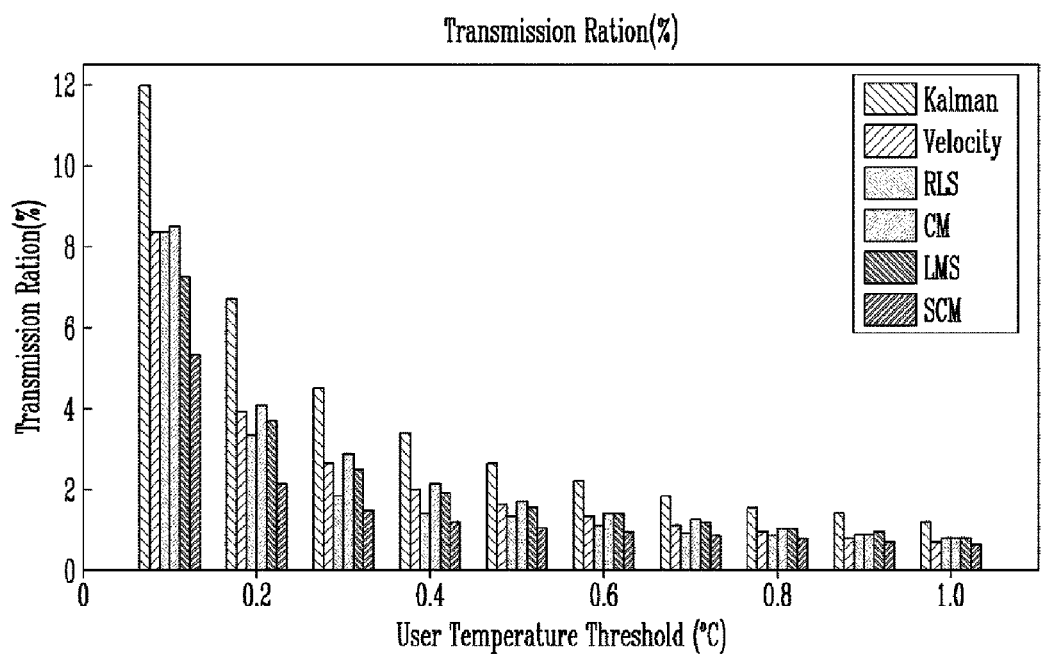
FIG. 6 is a view illustrating the number of times of transmitting a sensing value in response to an algorithm.

FIG. 6 is a view illustrating the number of times of transmitting a sensing value in response to an algorithm.

FIG. 6 illustrates the Kalman, Velocity, RLS, CM, and LMS measured while increasing the error range (the first and second error range being the same) by 0.1 unit, and the number of times of transmitting a sensing value in response to the SCM method of the present disclosure.

Referring to FIG. 6, in the Kalman, Velocity, RLS, CM, LMS and SCM method, the greater the error range, the smaller the number of times of transmitting a sensing value. Furthermore, in the case of having a same error range, the SCM method of the present disclosure has the smallest number of times of transmitting a sensing value. That is, when compared to other methods, the SCM method of the present disclosure is capable of minimizing the amount of data transmission using the network.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A building sensing management system comprising:
    a plurality of sensors configured to sense information of surrounding environment, and, in response to a sensing value transmitted to a controller having a slope of a same directivity for twice or more times, to obtain a predicted slope using a current slope of the transmitted sensing values; and
    the controller configured to obtain the predicted slope using a same algorithm as the sensors,
    wherein, in response to a next sensing value being within an error range of the predicted slope, the sensors do not transmit the next sensing value to the controller, and
    wherein each of the plurality of the sensors obtains the predicted slope by assigning a high weighted value to a current slope generated by itself and assigning a low weighted value to a current slope being provided from other sensors.

2. The system according to claim 1,
    wherein, in response to the next sensing value being outside the error range of the predicted slope, the plurality of sensors transmit the next sensing value to the controller.

3. The system according to claim 2,
    wherein, in response to the next sensing value reported to the controller having a slope of a same directivity as the current slope, the sensors and the controller re-set the current slope by adding the next sensing value.

4. The system according to claim 2,
    wherein, in response to the next sensing value reported to the controller having a slope of a directivity different from the current slope, the sensors and the controller are driven in a CM (Constant Measurement) method.

5. The system according to claim 1,
    wherein the error range varies in proportion to the current slope.

6. The system according to claim 1,
    wherein the current slope includes a plurality of slopes (Xn, Xn-1, . . . ) in response to the sensing values transmitted to the controller, and
    the predicted slope is generated by assigning the high weighted value to a recent slope (Xn) and assigning the low weighted value to a previous slope (Xn-1, . . . ).

7. The system according to claim 1,
wherein the error range is obtained in response to a change in a slope using cos as in math formula 2, $$THnew = \frac{THorg}{\cos\theta}, \quad \text{[math formula 2]}$$

where THnew indicates the error range that changes in response to the slope($\theta$), and THorg indicates an initial error range.

8. The system according to claim 1,
wherein, in response to a half or more of directivities of current slopes provided from other sensors being changed, each of the sensors sets the current slope to "0", and is driven in response to a CM (Constant Measurement) method.

9. The system according to claim 1,
wherein, in response to a half or more of directivities of current slopes provided from other sensors being changed, each of the sensors obtains the predicted slope by assigning a high weighted value to the current slope being provided from other sensors, and assigning a low weighted value to the current slope generated by itself.

10. A method for driving a building sensing management system that includes a plurality of sensors for collecting environment information, each of the sensors comprising:
collecting the environment information to generate a sensing value, and transmitting the generated sensing value to a controller at least twice;
in response to the sensing value transmitted to the controller having a slope of a same directivity for twice or more times, obtaining a predicted slope using a current slope; and
in response to a next sensing value being within an error range of the predicted slope, not transmitting the next sensing value to the controller, and in response to the next sensing value being outside the error range of the predicted slope, transmitting the next sensing value to the controller;
wherein each of the plurality of the sensors obtains the predicted slope by assigning a high weighted value to a current slope generated by itself and assigning a low weighted value to a current slope being provided from other sensors.

11. The method according to claim 10,
wherein the sensors and the controller obtain the predicted slope by a same algorithm.

12. The method according to claim 10,
wherein, in response to the next sensing value reported to the controller having a slope of a same directivity as the current slope, re-setting the current slope by adding the next sensing value.

13. The method according to claim 10,
wherein, in response to the next sensing value reported to the controller having a slope of a directivity different from the current slope, the sensors and the controller are driven using a CM (Constant Measurement) method.

14. The method according to claim 10,
wherein the error range varies in proportion to the slope.

15. The method according to claim 10,
wherein the error range is obtained in response to a change in a slope using cos as in math formula 2, $$THnew = \frac{THorg}{\cos\theta} \quad \text{[math formula 2]}$$

where THnew indicates the error range that changes in response to the slope($\theta$), and THorg indicates an initial error range.

\* \* \* \* \*